US006796031B1

(12) United States Patent
Russell

(10) Patent No.: US 6,796,031 B1
(45) Date of Patent: Sep. 28, 2004

(54) PROCESS FOR SETTING BEARINGS AND VERIFYING FORCE PRELOAD

(75) Inventor: Daniel T. Russell, East Sparta, OH (US)

(73) Assignee: The Timken Company, Canton, OH (US)

( * ) Notice: Subject to any disclaimer, the term of this patent is extended or adjusted under 35 U.S.C. 154(b) by 0 days.

(21) Appl. No.: 10/389,305

(22) Filed: Mar. 14, 2003

(51) Int. Cl.$^7$ ............................................. B21D 53/10
(52) U.S. Cl. .............................. 29/898.09; 29/898.07; 29/407.02; 33/517; 73/862.19
(58) Field of Search .......................... 29/898.09, 898.07, 29/407.02; 73/1.09, 862.195; 33/517

(56) References Cited

U.S. PATENT DOCUMENTS

| | | | |
|---|---|---|---|
| 3,830,633 A | * 8/1974 | Harbottle ................. | 29/898.09 |
| 4,150,468 A | * 4/1979 | Harbottle ................. | 29/898.09 |
| 4,165,636 A | * 8/1979 | Bartholet ............... | 73/862.541 |
| 4,172,621 A | * 10/1979 | Yoshida ...................... | 384/563 |
| 5,325,599 A | 7/1994 | Russell | |
| 5,597,965 A | * 1/1997 | Endo et al. ............... | 73/862.49 |
| 6,000,134 A | * 12/1999 | Jerraid ..................... | 29/898.09 |
| 6,343,420 B1 | * 2/2002 | Beduhn et al ........... | 29/898.07 |
| 6,460,423 B1 | * 10/2002 | Keller et al. ............. | 73/862.49 |
| 6,662,449 B2 | * 12/2003 | Rode ....................... | 29/898.09 |

FOREIGN PATENT DOCUMENTS

| | | | |
|---|---|---|---|
| GB | 2261288 | * 5/1993 | |
| SU | 1315676 | * 6/1987 | |

OTHER PUBLICATIONS

Brochure entitled "Gauging Concepts For Setting Tapered Roller Bearings" published by The Timken Company (1984); Service Engineering Department.

* cited by examiner

*Primary Examiner*—Eric Compton
(74) *Attorney, Agent, or Firm*—Polster, Lieder, Woodruff & Lucchesi, L.C.

(57) ABSTRACT

A pair of tapered roller bearings, which are located between two machine components, such as a pinion shaft and its carrier, to enable the one component to rotate relative to the other one, is set to a desired dimensional preload with the aid of a gauge and the force preload in the bearing is determined to verify that it is within acceptable limits. The gauge is interposed between a raceway and rolling elements of the second bearing to measure the size of a spacer required to give the two bearings the correct dimensional preload. The gauge also exerts a known axial force on the bearings, and while that force is maintained, the torque required by the bearings is measured. That torque divided by the axial load gives a torque signature. Thereafter, the gauge is removed, the spacer is selected and installed, and the bearings are installed in their operative positions. The spacer sets the bearings with a desired dimensional preload. Then, with the desired dimensional preload in the bearings, the torque required by the bearings is measured. The force preload in the bearings is calculated by dividing the measured torque at the desired dimensional preload by the torque signature.

13 Claims, 3 Drawing Sheets

PROCESS FOR SETTING BEARINGS AND VERIFYING FORCE PRELOAD

CROSS REFERENCE TO RELATED APPLICATIONS

STATEMENT REGARDING FEDERALLY SPONSORED RESEARCH OR DEVELOPMENT

Not Applicable

BACKGROUND OF THE INVENTION

This invention relates in general to opposed antifricton bearings and more particularly to a process for setting such bearings in preload and for verifying the force preload.

One can find rotating shafts in a wide variety of machinery, and when such shafts carry heavy loads or must rotate with a good measure of precision, they are often supported on antifricton bearings. Usually the antifriction bearings arranged in a pair, with the bearings of the pair being adjusted against each other to a desired setting. Typical of the bearings are single row tapered roller bearings. When positioned with the large ends of the tapered rollers in the two bearings presented away from each other (indirect mounting) or the large ends of the rollers presented toward each other (direct mounting), displacement of one race of one of the bearing axially will change the setting for the two bearings.

Where the axis of rotation must remain perfectly stable, such as in the pinion assemblies for automotive differentials or in machine tool spindles, the bearings that support the rotating components should operate in a condition of preload, which is characterized by an absence of clearances, both axial and radial, in the bearings. Typically, preload, like end play where clearances exist, is considered in the context of an axial dimension (e.g. 0.002 in. preload), but the real and more meaningful measure of preload is in the context of the internal forces captured by the opposed bearings. In this regard, several pairs of bearings identical in size and configuration, all set to the same dimensional preload could well lock in different internal forces, that is to say, different force preloads. Pinion assemblies for automotive differentials illustrate the problems and uncertainties one encounters in connection with setting the bearings. The typical pinion assembly has a carrier, a pinion shaft provided with a pinion at its one end, and a pair of tapered roller bearings which support the shaft in the carrier. When the carrier is attached to the main housing of a differential, the pinion meshes with a ring gear, and to insure that the mesh is proper, the bearings must be set to preload.

Typically, the procedure for adjusting the bearings in a pinion assembly involves fitting the shaft to the carrier with one of the tapered rollers of the bearing seated along the raceways for that bearing. Thereupon, measurements are taken from the other bearing to determine the size of a spacer, which, when installed, will impart the proper preload to the two bearings. The assembly procedure is then completed using the spacer. Thereafter, the torque required to rotate the shaft is measured to see if it falls within acceptable limits. But torque does not provide a very good measure of preload, because in identical pinion assemblies set to the same force preload, torque can vary as much as ±20%. In view of this variance, some pinion assemblies which exhibit torque outside the accepted range may actually have an acceptable force preload. This can lead to expensive disassembly and reassembly. Then again, some that exhibit a torque within the acceptable range may actually have an unacceptable force preload. And too much force preload can lead to early failure of the bearings. On the other hand, too little force preload may permit excursions into end play owing to differential thermal expansions between the carrier and shaft during operation. End play detracts for the stability of the pinion shaft and may allow the pinion to assume positions which lead to wear and create annoying noise.

SUMMARY OF THE INVENTION

The present invention resides in a process for setting opposed antifriction bearings with a desired dimensional preload and verifying that the force preload is acceptable. To this end, machine components are assembled with one of the bearings in place between them. The other bearing has a gauge interposed in it and the gauge provides measurement for determining the size of a spacer which will give the bearings a desired dimensional preload. The gauge also exerts a known axial force on the bearings, and while that force is exerted the torque required by the bearings is measured. This provides a torque signature. When the other bearing is assembled without the gauge and with the spacer installed to provide the desired dimensional preload, the torque is again measured, and from this new torque and the torque signature, one can determine the load, that is the force preload, in the bearings.

DETAILED DESCRIPTION OF THE INVENTION

The process for setting bearings in preload and verifying that preload in terms of force finds utility in connection with a wide variety of machinery employing shafts mounted on opposed tapered roller bearings. Actually, its utility extends to opposed bearings that enable a machine component to rotate relative to another machine component with a good measure of stability, and this requires that the bearings be in preload. Typical of such an arrangement is a pinion assembly A which is bolted to the housing of an automotive differential to engage and rotate the ring gear in the differential.

Figure 1:
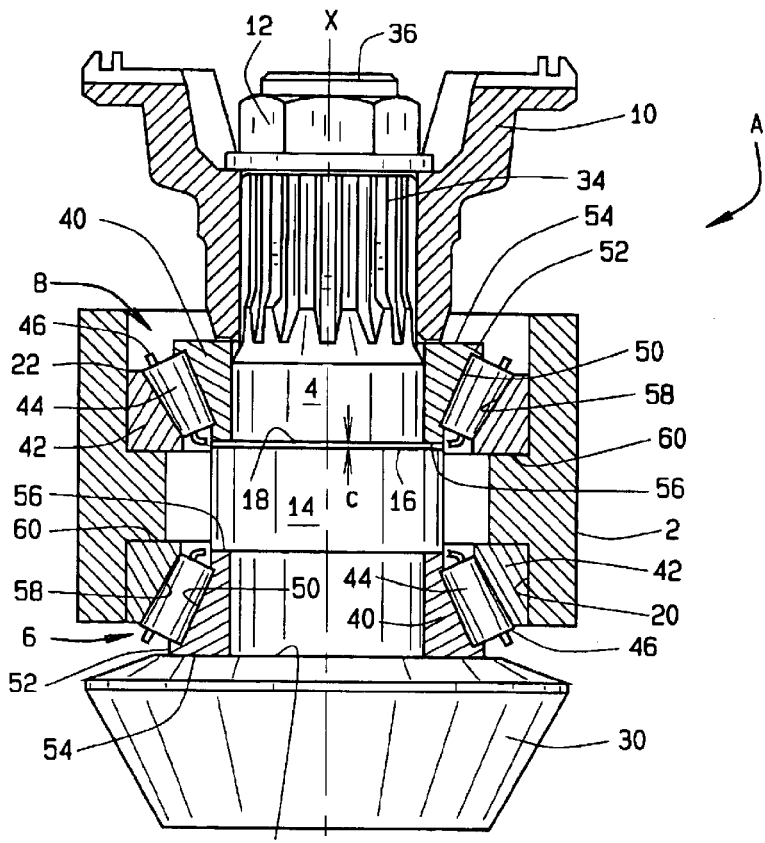
FIG. 1 is a sectional view of a pinion assembly, the bearings of which have been set and verified in accordance with the present invention.

The pinion assembly A includes (FIG. 1) a carrier 2, a pinion shaft 4 that extends through the carrier 2, head and tail bearings 6 and 8, respectively, which support the pinion shaft 4 in the carrier 2, a yoke 10 fitted to the tail end of the pinion shaft 4, and a nut 12 threaded over the end of the pinion shaft 4 to retain the yoke 10 firmly on the shaft 4. The bearings 6 and 8 enable the shaft 4 to rotate about an axis X and are set to a condition of preload, so that the axis X remains perfectly stable with respect to the carrier 2. To this end, the bearings 6 and 8 are mounted in opposition in the indirect configuration, with the preload setting being controlled by a sleeve 14 and a spacer 16 that are located around the shaft 4, with the spacer 16 being against a reference surface 18 on the end of the sleeve 14.

The carrier 2 is actually a subhousing which is bolted to the main housing of the differential. It has two bearing seats 20 and 22, the former for the head bearing 6 and the latter for the tail bearing 8.

The shaft 4 extends through the carrier 2 where the bearing seats 20 and 22 of the carrier 2 surround it. The shaft 4 projects out of the head end of the carrier 2, and here it is provided with a pinion 30. The back of the pinion 30 forms a shoulder 32 at the head end of the shaft 4, with the shoulder 32 being squared off with respect to the axis X. The shaft 4 also projects out of the tail end of the carrier 2, and here it is provided with a spline 34 and beyond the spline 34 with a reduced end 36 which is threaded.

Each bearing 6 and 8 includes (FIGS. 1 & 2) an inner race in Fe form of a cone 40, and outer race in the form of a cup 42, rolling elements in the form of tapered rollers 44, and a cage 46. The rollers 44 lie in a single row between the cone 40 and the cup 44, while the cage 46 maintains the correct spacing between the rollers 44 and further holds the rollers 44 around the cone 40 when the cone 40 is removed from the cup 42, so that the cone 40, rollers 44, and cage 46 form a cone assembly.

The cone 40 has a tapered raceway 50, which is presented outwardly away from the axis X, and a thrust rib 52 at the large end of the raceway 50. On the end of the thrust rib 52 the cone 40 has a back face 54, and at its opposite end, beyond the small end of the raceway 50, the cone 40 has a front face 56. Both the back face 54 and front face 56 are squared off with respect to the axis X.

The cup 42 has a tapered raceway 58, which is presented inwardly toward the axis X, and a back face 60 at the small end of the raceway 58. The back face 60 is also squared off with respect to the axis X.

The tapered rollers 44 fit between the cone 40 and cup 42 with their tapered side faces against the raceways 50 and 58 and their large end faces against the thrust rib 52. Indeed, the thrust rib 52 prevents the rollers 44 from moving up the raceways 50 and 58 and out of the space bet n the cone 40 and cup 42. The rollers 44 are on apex, meaning that the conical envelopes formed by their tapered side faces have their apices at a common point along the axes X. The conical envelopes formed by the raceways 50 and 58 have their apices at the same point The cones 40 of the two bearings 6 and 8 fit over the pinion shaft 4, each with an interference fit. The back face 54 for the cone 40 of the head bearing 6 bears against the shoulder 32 on the pinion 30, whereas the back face 54 for the cone 40 of the tail bearing 8 bears against the yoke 10 which is held firmly against it by the nut 12. The sleeve 14 and spacer 16 also fit around the shaft 4 when they lie between the two cones 40. Indeed, the sleeve 14 and spacer 16 are damped snugly between the front faces 56 on the two cones 40. The cup 42 for the head bearing 6 fits into the bearing seat 20 in the carrier 2, whereas the cup 42 for the tail bearing 8 fits into the other bearing seat 22, there being interference fits between the cups 42 and their respective bearing seats 20 and 22. Moreover, the back faces 60 of the two cups 42 bear firmly against the ends of their respective bearing seats 20 and 22. The rollers 44 for the two bearings 6 and 8 lie between the raceways 50 and 58 on the cones 40 and cups 42 of those bearings 6 and B. Here their tapered side faces contact the raceways 50 and 58, whereas their large end faces bear against the thrust ribs 52. Since the bearings 6 and 8 are in preload, no clearances exists between any of the rollers 44 and the raceways 50 and 58 between which they are located.

The thickness of the spacer 16 controls the magnitude of the preload in the bearings 6 and 8, and to determine the thickness required to provide the proper preload, one must know the distance that the front face 56 for the cone 40 of the tail bearing 6 will locate from the reference surface 18 at the end of the sleeve 14 when the bearings 6 and 8 are in a condition of zero end play, that is to say, when there is neither end play nor preload in the bearings 6 and 8. This distance cannot be measured when the cone 40 of the tail bearing 8 is around the shaft 4 in its operating position, since its front face 56 is too obscured for such a measurement. Instead a gauge B (FIGS. 2–4), which in effect projects the raceway 58 of the cup 42 for the tail bearing 8 and the reference surface 18 of the sleeve 14 out of the carrier 2, is utilized.

Figure 3:
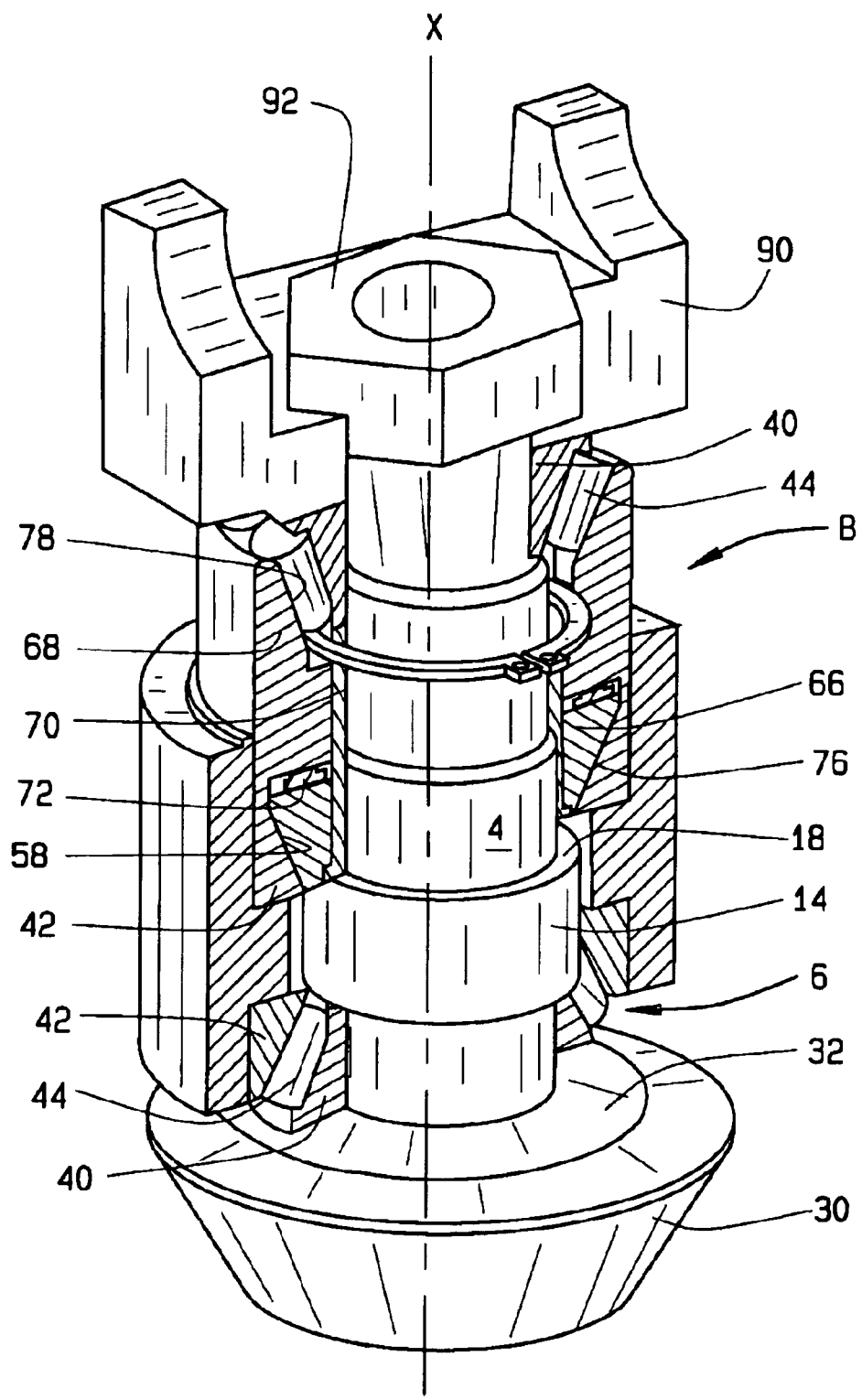
FIG. 3 is a perspective view, partially broken away and in section, of the pinion assembly, with the gauge fitted to one of its bearings.

The gauge B is employed with the pinion assembly A partially assembled, that is to say, assembled to the extent that the pinion shaft 4 extends through the carrier 2 with is head bearing 6 in place and the rollers 44 of that bearing seated against the raceways 50 and 58 of it cone 40 and cup 42 (FIG. 3). The partial assembly further includes installation of the cup 42 for the tail bearing 8 in its seat 22 in the carrier 2 and placement of the sleeve 14 over the pinion shaft 4 and against the front face 56 for the cone 40 of the head bearing 6.

The gauge B basically includes (FIG. 4) a male element 66 and a female element 68 which are located essentially end to end and in addition an intervening element 70 which extends between the male and female elements 66 and 68. The gauge B also has a spring 72 which urges the male and female elements 66 and 68 apart.

Both the male element 66 and the female element 68 fit over the intervening element 70 where they are capable of shifting axially with respect to it and to each other. The male element 66 has a tapered surface 76 which is presented outwardly away from the axes X. The taper of the surface 76 conforms to the taper of the raceway 58 on the cup 42 of the tail bearing 8 and is further of a diameter small enough to enable the male element 66 to fit into the cup 42 of the bearing 8. When so fitted, the tapered surface 76 seats perfectly against the raceway 58, which provides one of two conical envelopes employed by the gauge B. Essentially the female member 68 lies axially beyond the male member 66. It has a tapered surface 78 which is presented inwardly toward the axis X. Its taper and size conform to the other conical envelope employed by the gauge B, that is the envelope formed by the outwardly presented faces of the rollers 44 for the tail bearing 8. After all, when the tail bearing 8 is assembled in its operating condition, the tapered rollers 44 that surround its cone 40 seat against the tapered race raceway 58 of its cup 42—or in other words the two conical envelopes are then coincident. The intervening element 70 fits within the male and female elements 66 and 68 such that the two elements 66 and 68 can slide over it. Thus, the male and female elements 66 and 68 may each assume infinite positions with respect to the intervening element 70 and with respect to each other as well. The intervening element 70 has an inner end 80 which is configured to seat against the reference surface 18 on the sleeve 14 and an outer end 82 which is configured to fit against the front face 56 of the cone 40 for the tail bearing 8. The two ends 80 and 82 lie a fixed and known distance a apart The spring 72 fits around the intervening element 70 and between the male and female elements 66 and 68 and urges them apart. It may take the form of a Belleville spring or even a coil spring. Irrespective of its configuration, it carries a strain sensor 84 which senses the strain in the spring 72 and produces a signal that reflects that strain. The signal is monitored by instruments which basically convert the strain into the distance between the male and female elements 66 and 68, and further into the force exerted by the spring 72 on the two elements 66 and 68.

Figure 4:
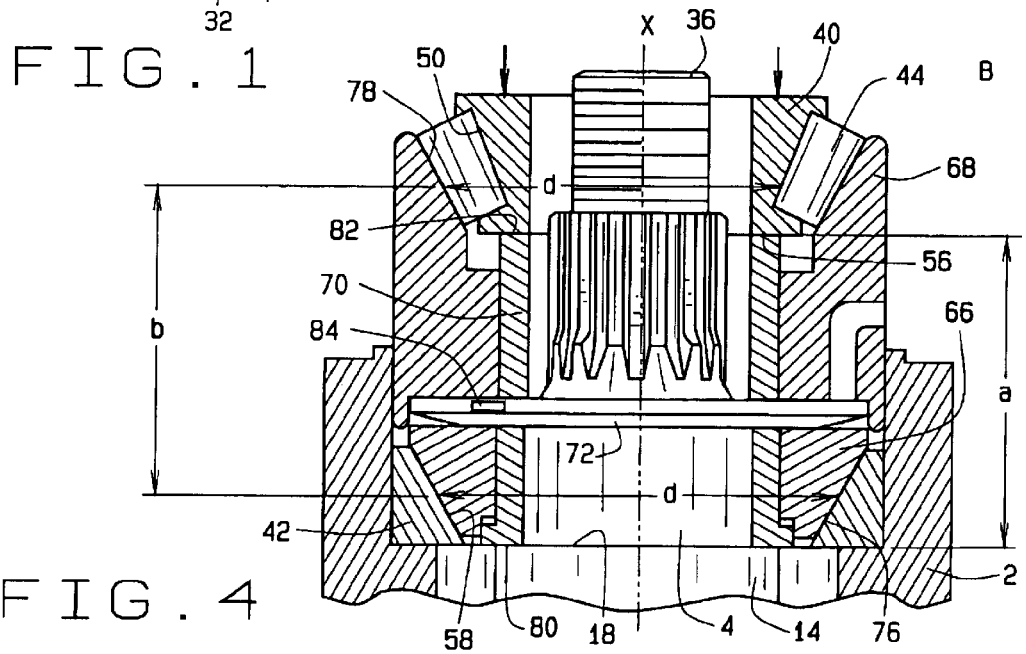
FIG. 4 is an enlarged sectional view of the gauge and the bearing to which it is fitted.
Figure 2:
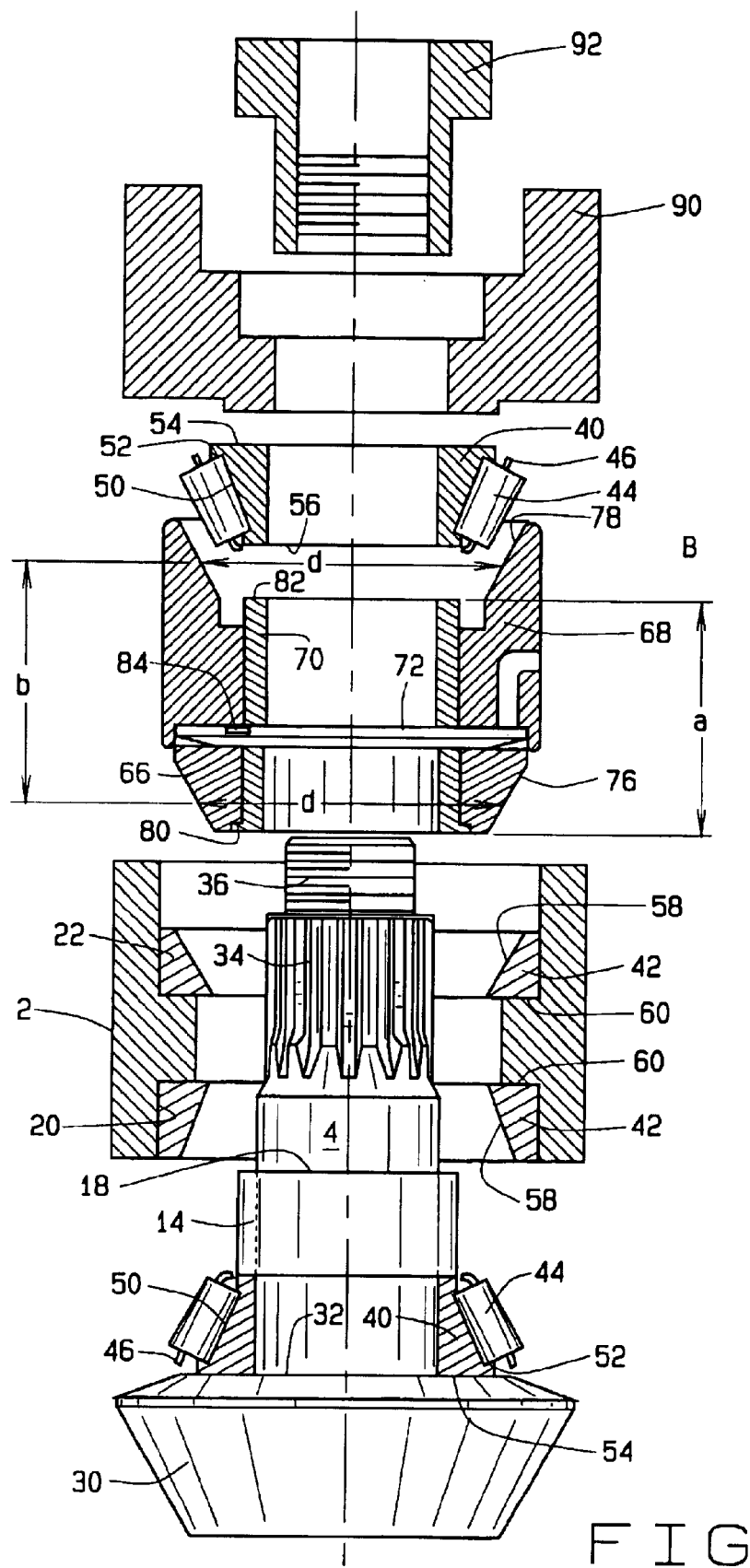
FIG. 2 is an exploded sectional view of the pinion assembly with the gauge interposed between components of one of the bearings of the assembly.

The male element 66 and the female element 68 possess equivalent diameters d along their respective tapered surfaces 76 and 78 (FIGS. 2 & 4). The equivalent diameters d are separated by an axial distance b, and that distance varies, although slightly, between different pairs of bearings 6 and 8.

In order to ascertain the axial dimension c (FIG. 1) for the spacer 16 required to provide the bearings 6 and 8 with the proper dimensional preload p, the gauge B installed over the tail end of the partially assembled pinion assembly A (FIGS. 3 & 4). In particular, the gauge B is lowered over the pinion shaft 4 at the tail end of the assembly A far enough to enable the tapered surface 76 on its male element 66 to seat against the tapered raceway 58 for the tail cup 42 and also far enough to enable the inner end 80 of the intervening element 70 to seat against the reference surface 18 on the sleeve 14. The male element 66 and intervening element 70 thus assume fixed positions with respect to the head bearing 6. Thereupon, the cone assembly for the tail bearing 8, that is its cone 40 together with its tapered rollers 44 and cage 46, is inserted into the female element 68. The rollers 44 seat against the raceway 50 of the cone 40 and also against the tapered surface 78 of the female element 68. While the front face 56 of the cone 40 is presented opposite the outer end 82 of the intervening element 70, it remains separated from the outer end 82 at this juncture. The cone 40 of the tail bearing 6 thus becomes a positional race, the axial position of which along the shaft 4 determines the setting for the bearings 6 and 8.

The reduced end 36 of the pinion shaft 4 projects out of the gauge B, and an assembly yoke 90 is fitted over it, so that the yoke 90 bears against the back face 54 of the tail cone 40. Finally, the threads on the reduced end 36 of the shaft 4 are engaged with an assembly nut 92 which is turned down against the yoke 90. Indeed, the nut 92 forces the female element 68 downwardly against the bias of the spring 72 until the front face 56 of the cone 40 (FIG. 3) comes against the outer end 82 of the intervening element 70 of the gauge B. In other words, the assembly nut 92 is tightened far enough to clamp the cone 40 of the head bearing 6, the sleeve 14, the intervening element 70 of the gauge B, and the cone 40 of the tail bearing 8 all tightly together between the pinion 30 and the assembly yoke 90. The spring 72 compresses, and the sensor 84 applied to it produces a signal reflecting the distance the female element 68 moves toward the male element 66. This determines the distance b between the like diameters d on the male and female elements 66 and 68.

When the instrument registers the measured distance b, the pinion shaft 4 should rotate relative to the carrier 2. This insures that the rollers 44 of the head bearing 6 seat property against the raceways 56 and 58 and thrust rib 52 of that bearing, and that the rollers 44 of the tail bearing 8 seat properly against the raceway 50 and the thrust rib 52 of the tail cone 40 and also against the tapered surface 78 of the female element 68 on the gauge B. The rotation is imparted to the pinion shaft 4 at the assembly yoke 90 which is temporarily on it. Not only does the instrument that is attached to the sensor 84 register the distance b between the diameters d on the tapered surfaces 76 and 78 of the male and female elements 66 and 68, respectively, but it also determines the force exerted by the spring 72. The torque required to maintain the rotation is also measured. The force represents a temporary or assembly load in the bearings 6 and 8 with the gauge B interposed between the cup 42 and the cone assembly of the tail bearing 8.

From the distance b measured by the gauge B and the fixed distance a that the intervening element 70 spaces the tail cone 40 from the reference surface 18 on the sleeve 14, one can calculate the axial dimension c for the spacer 16 which will provide the desired dimensional preload p to the two bearings 6 and 8. In particular:

$$c = a - b + p - i$$

The formula takes into account the change i in the axial dimension owning to the interference fit of the cone 40 for the tail bearing 8.

From the force f registered by the instrument to which the sensor 84 is connected and the torque t applied to the assembly yoke 90, one can obtain a torque signature s for the two bearings 6 and 8. In particular:

$$s = t/f$$

Once the torque signature s is known, one can calculate the force preload in the bearing simply by measuring the torque required to rotate its pinion shaft 4, that is to say:

$$f = t/s$$

And indeed, once the pinion assembly A is fully assembled (FIG. 1) with the rollers 44 of its tail bearing 8 seated against not only the raceway 50 of its cone 40, but also against the raceway 58 of its cup 42, and further with spacer 16 and the the operating yoke 10 and nut 12 in place, the force preload in the bearings 6 and 8 is measured to insure that it falls within acceptable limits. In this regard, the spring 72 of the gauge B applies some preload to the bearings 6 and 8, with that preload insofar as the tail bearing 8 is concerned being transferred between the cone 40 and cup 42 through the gauge B and rollers 44 instead of directly through the rollers 44. The preload imparted by the gauge B produces a torque signature s for the two bearings 6 and 8. That signature then becomes the basis for ascertaining the force preload in the fully assembled pinion assembly A and verifying that it falls within acceptable limits. In particular, the torque signature s remains the same for the bearings 6 and 8 irrespective of preload. The torque t varies with preload. Thus, using the torque signature and the torque t measured for the assemble pinion assembly A, one determines the force preload using the formula:

$$f = t/s$$

The procedure for setting bearings and verifying force preload may be used for bearings mounted in the direct configuration as well, that is to say, with bearings having the large ends of the rollers in the two rows presented toward each other. Moreover, for some measurements it may be desirable to have the tapered surfaces 76 and 78 on a single gauge element where they are a fixed distance apart and the ends 80 and 82 on end-to-end elements with the spring 72 between those elements, so that the distance between the ends 80 and 82 becomes the measured distance. Basically, the procedure, irrespective of the location of the tapered surfaces 76 and 78 and the ends 80 and 82, uses the difference between a measured distance and a fixed distance to determine the size of a spacer which will provide opposed bearings with the proper setting.

What is claimed is:

1. A process for ascertaining the force preload in first and second antifriction bearings which enable one machine component to rotate relative to another machine component about an axis of rotation, each bearing having raceways located oblique to the axis and rolling elements between the raceways, so that the bearings will accommodate both radial and axial loads, the first and second bearings being mounted in opposition to accommodate axial loads in both axial directions; said process comprising:

installing the first bearings between the two components;

installing the second bearing between the two components with a gauge interposed in the second bearing;

with the gauge exerting a known axial force on the first and second bearings such that the force transfers through the rolling elements of the bearings;

measuring the torque imparted by the bearings when the bearings are initially installed with the known force exerted by the gauge;

establishing a torque signature from the known force and the measured torque;

removing the gauge from the second bearing and installing the bearings between the two components with a preload;

thereafter measuring the torque imparted by the reinstalled bearings; and from the torque measured in the reinstalled bearings and from the torque signature, determining the force preload in the reinstalled bearings.

2. The process according to claim 1 wherein the gauge has first and second gauge elements wherein the step of exerting a known axial force on the first and second bearings comprises interposing between the rolling elements of the second bearing and one of the raceways of the second bearing the first and second gauge elements; and wherein the known force exerted by the gauge urges the gauge elements apart.

3. The process according to claim 2 wherein the known force is produced by a spring between the first and second gauge elements.

4. The process according to claim 1 and further comprising imparting a known dimensional preload to the bearings when they are reinstalled between the first and second machine components.

5. The process according to claim 4 wherein the dimensional preload is determined with the gauge and wherein the gauge has a first gauge element which is applied to one of the raceways of the second bearing and a second gauge element which is applied to the rolling elements of the second bearing; and wherein the gauge also has a third gauge element which positions a race on which one of the raceways of the second bearing is located a known distance from a reference surface that is in a fixed position on one of the machine components, and a spring which urges the first and second gauge elements apart.

6. The process according to claim 1 wherein the raceways are tapered and the rolling elements are tapered rollers.

7. The process according to claim 1 wherein the torque signature is a function of the axial load applied to the bearings and the torque required to effect rotation of one of the machine components relative to the other machine component.

8. A process for installing first and second tapered roller bearings between two machine components to enable one of the components to rotate relative to the other component about an axis of rotation, each of the bearings having inner and outer tapered raceways and tapered rollers arranged in a single row between the raceways, the first and second bearings being mounted in opposition, with one of the raceways of the second bearing being on a positional race, the axial position of which determines the setting for the bearings, the positional race having a first conical envelope along it and the other raceway of the second bearing having a second conical envelope along it, which conical envelopes match and are coincident when the second bearing is fully assembled, one of the conical envelopes being defined by the tapered rollers; said process comprising:

fitting the first component to the second component with the first bearing between the two components and with the tapered rollers of the first bearing seated against the inner and outer raceways for the first bearing;

fitting the second bearing between the two components with its conical envelopes separated axially and with a gauge interposed between the axially separated first and second conical envelopes, the gauge having elements which exert a known axially directed force on the second bearing at its separated conical envelopes;

with the gauge, determining the size of a spacer, which when fitted between the positional race and a reference surface on one of the components, will provide the bearings with a desired dimensional preload;

determining the torque required to effect rotation of one machine component relative to the other under the known axial force, determining the torque signature for the bearings from the known axial force and the torque required by the bearings under that force;

removing the gauge and fitting the second bearing between the two components with its conical envelopes coincident and with the two bearings having the desired dimensional preload;

measuring the torque required to effect rotation between the first and second machine components when the bearings have the desired dimensional preload; and from the torque measured when the bearings have the desired dimensional preload and from the torque signature, determining the force preload in the bearings.

9. The process according to claim 8 wherein the torque signature for the bearings is a function of the axial load in the bearings and the torque required to rotate one component relative to the other component in the absence of any other load on the components.

10. The process according to claim 9 wherein the gauge comprises:

a first element provided with a tapered surface that seats against the first conical envelope, a second element provided with a tapered surface that seats against the second conical envelope, and a spring which urges the first and second elements apart and thereby produces the known axial force.

11. The process according to claim 10 wherein the gauge has a third element which can shift axially relative to the first and second elements and has a fixed axial dimension; and wherein the step of determining the size of a spacer comprises:

placing one end of the third element of the gauge against the reference surface;

placing the positional race against the other end of the third element;

and determining the difference between the distance between equal diameters on the tapered surfaces of the first and second envelopes and the fixed axial dimension of the third element.

12. A process for installing a shaft in a housing, said process comprising:

installing a first tapered bearing between the shaft and the housing, with the first bearing having a tapered inner raceway carried by the shaft, a tapered outer raceway carried by the housing, and tapered rollers arranged in a single row between the inner and outer raceways;

installing a tapered outer raceway for a second bearing in the housing with its small end is presented toward the small end of the inner raceway for the first bearing;

positioning a reference surface along the shaft;

fitting a gauge to the outer raceway of the second bearing and against the reference surface along the shaft;

fitting an inner race and tapered rollers for the second bearing to the gauge with the inner race having a tapered inner raceway and the rollers being along the raceway, the inner race and tapered rollers being against the gauge;

with the gauge, applying a known axial force to the bearings, which force urges the rollers of the first bearing against the raceways for that bearing and urges the rollers of the second bearing against the inner raceway for that bearing and against the gauge and also urges the gauge against the outer raceway for the second bearing;

measuring the torque required by the bearings under the known axial force;

determining the torque signature for the bearings from the measured torque and the known force;

with the gauge, determining the thickness of a spacer which will provide the bearings with a desired dimensional preload;

removing the gauge from the outer raceway of the second bearing and removing the inner race and rollers of the second bearing from the gauge;

providing a spacer having the thickness determined and placing the spacer against the reference surface;

installing the inner race of the second bearing over the shaft and the rollers for the second bearing along the outer raceway for the second bearing;

securing the inner race of the second bearing on the shaft and against the spacer, so that the bearings possess the desired dimensional preload;

measuring the torque required by the bearings when under the desired dimensional preload; and from the torque measured when the bearings have the desired dimensional preload and from the torque signature, determining the force preload in the bearings.

13. The process according to claim 12 wherein the gauge comprises: a first element having a tapered surface that seats against the tapered outer raceway of the second bearing; a second element which may shift axially with respect to the first element and has a tapered surface against which the rollers of the second bearing seat, a third element which has a fixed axial dimension and can shift axially with respect to the first and second elements, the third element being fitted between and contacting the reference surface and the inner race of the second bearing; and a spring for urging the first and second elements apart to seat the rollers of the first bearing against the raceways of the first bearing, to seat the rollers of the second bearing against the raceway on the inner race of the second bearing and the tapered surface of the second element, and to seat the tapered surface of the first element against the outer raceway of the second bearing; and wherein the step of determining the thickness of the spacer includes determining the distance between equivalent diameters on the tapered surfaces of the first and second elements and subtracting that distance from the fixed axial dimension of the third element.

* * * * *